D. L. HOLDEN.

ICE MACHINE PRESS.

APPLICATION FILED MAR. 25, 1909.

Reissued July 27, 1909.

12,999.

2 SHEETS—SHEET 1.

Witnesses

T. L. Hodson

D. V. Pierpoint

Inventor

D. L. Holden by Walter F. Rogers

Attorney

ANDREW B. GRAHAM CO., PHOTO-LITHOGRAPHERS, WASHINGTON, D. C.

D. L. HOLDEN.

ICE MACHINE PRESS.

APPLICATION FILED MAR. 25, 1909.

Reissued July 27, 1909.

12,999.

2 SHEETS—SHEET 2.

Witnesses

T. L. Moorhouse

D. V. Pierpont

Inventor

D. L. Holden

By

Walter F. Rogers

Attorney

ANDREW B. GRAHAM CO., PHOTO-LITHOGRAPHERS, WASHINGTON, D. C.

UNITED STATES PATENT OFFICE.

DANIEL L. HOLDEN, OF NEW YORK, N. Y., ASSIGNOR, BY MESNE ASSIGNMENTS, TO FEDERAL ICE MACHINE COMPANY, A CORPORATION OF MAINE.

ICE-MACHINE PRESS.

No. 12,999. Specification of Reissued Letters Patent. Reissued July 27, 1909.

Original No. 876,352, dated January 14, 1908, Serial No. 313,560. Application for reissue filed March 25, 1909. Serial No. 485,862.

*To all whom it may concern:*

Be it known that I, DANIEL L. HOLDEN, a citizen of the United States, residing at New York, in the borough of Manhattan, county of New York, and State of New York, have invented certain new and useful Improvements in Ice-Machine Presses; and I do hereby declare the following to be a full, clear, and exact description of the invention, such as will enable others skilled in the art to which it appertains to make and use the same.

This invention is for the rapid manufacture of merchantable blocks of ice by the pressing and regelation of small particles of ice into a solid mass.

To enable a continuous operation, and great efficiency in production, a double acting hydraulic pressure cylinder and two ice presses are arranged in alinement, or tandem, the presses being at each end of the pressure cylinder, so that the presses are fed alternately and the ice blocks are discharged alternately from each press, which results in saving much time as well as greatly increasing the output over the former machines where only one press was operated by a pressure cylinder. There are other coacting means which contribute to perfect the operation, and which will be set forth in the specification.

Figure 1:
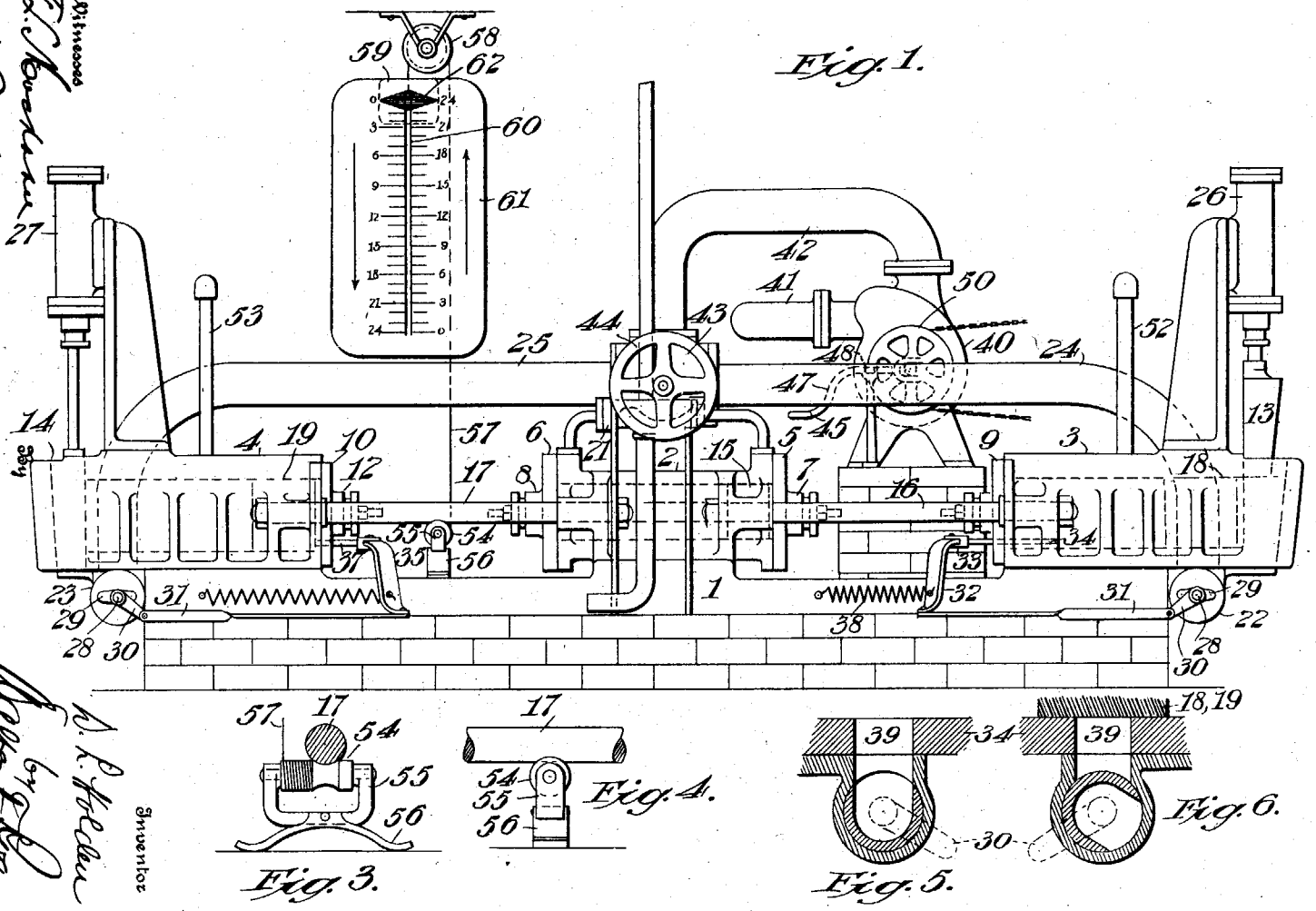
Figure 2:
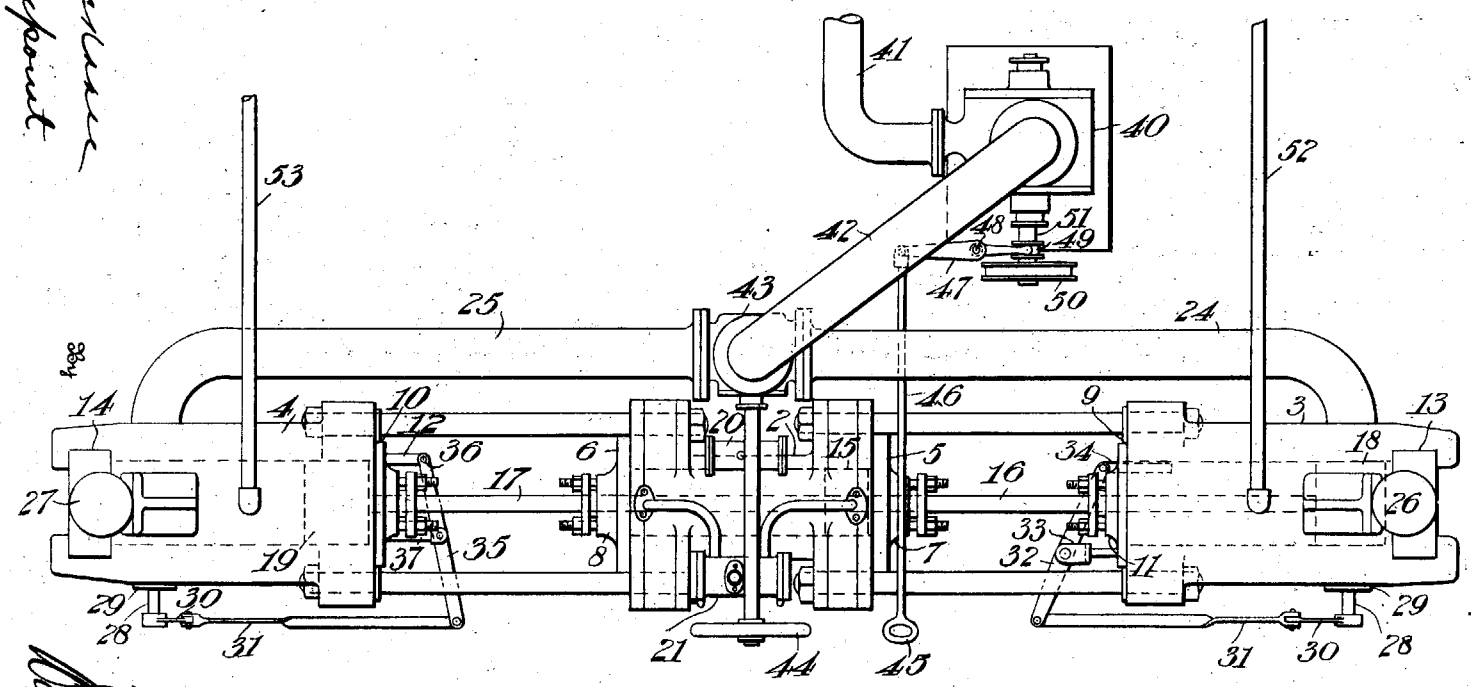

The invention is illustrated in the accompanying drawings, in which similar parts bear similar figures of reference wherever shown, in which, Figure 1 is a side elevation; Fig. 2 is a top or plan view; Figs. 3, 4 are enlarged views of the indicator roller and its support; Fig. 5 is a view of the valve for the ice presses, when open; Fig. 6 is a view of the valve for the ice presses, when closed.

A bed plate 1 provides a common support for a double acting hydraulic pressure cylinder 2, and ice presses 3, 4, one being at each end of the cylinder. The pressure cylinder has heads 5, 6 with stuffing boxes 7, 8 while heads 9, 10 with stuffing boxes 11, 12 are provided for the inner heads of the presses, their outer ends having vertically moving gates 13, 14. Within cylinder 2 there is a piston 15 with rods 16, 17 extending therefrom into the presses and connected to their rams 18, 19. In order to gain ready access to all the piston and rams, the presses 3, 4 are placed away from cylinder 2 far enough to permit head 5 to be detached and moved over to head 9, and head 10 to be detached and moved over to head 6, and with gate 13 moved up piston 15 may be moved to the open space between cylinder 2 and press 3, or by moving the opposite heads 6, 9 and gate 14 piston 15 may be moved to the space between cylinder 2 and press 4. The movement of piston 15 is controlled by a hydraulic valve 20, for light pressures, and by hydraulic valve 21, for greater pressures, these valves being of any of the well known constructions adapted to the purpose.

Under the presses 3, 4, near their outer ends, there are secured rotary valves 22, 23 which open and close the passage for the flow of ice particles or spicules from pipes 24, 25 to presses 3, 4 the passages being open when the rams 18, 19 are at the inner end of their stroke. By placing the valves 22, 23 under the presses any air which may be carried in with the ice particles will be free to escape by the means provided, and will not whiten the ice block, or prevent its solidity.

As seen in the views, gate 13 has been moved up by its cylinder 26 to open the end of press 3, ram 18 has been moved by piston 15 to expel an ice block and valve 22 is closed while ram 19 is at the inner end of its stroke, gate 14 is closed by its cylinder 27, valve 23 is open and ice particles are flowing into press 4. Valves 22, 23 are automatically opened by the rams 18, 19, each valve being provided with a stem 28 passing through a stuffing box 29 and having thereto attached an arm 30 connected to a rod 31. As valves 22, 23 must rotate in the same directions, in opening, and as rams 18, 19 move in opposite directions when opening the valves, it is necessary to provide a different means for ram 18 to operate valve 22 from that which is used by ram 19 to operate valve 23, therefore, rod 31 of valve 22 for press 3 is attached to a lever 32 with an intermediate or central fulcrum 33, and at its opposite end lever 32 has thereto attached a pin 34 which enters press 3 and is pushed outward by ram 18 to put valve 22 into its open position, as seen in Fig. 5; press 4 is provided with a lever 35 attached to rod 31 of its valve 23, the lever being fulcrumed at its opposite end 36, and intermediately there is attached a pin 37 which enters press 4 and is pushed outward by ram 19 to put valve 23 into its open position, as seen in Fig. 5; the rams overcome springs 38 which are attached to levers 32, 35 which operate to close valves 22, 23 when rams 18, 19 move away from pins 34, 37 to put the valves into the position, closed, as seen in Fig. 6, the ports 39 being covered by rams 18, 19 before the valves are again opened.

After the ice block has been discharged, the movable parts will assume the positions seen in press 4, where its gate 14 is moved down by cylinder 27 to close the press and ram 19 has moved to its inner position where it abuts pin 37, moving lever 35, overcoming spring 38 and opening valve 23 to permit the ice particles to pass into the press through port 39; when the ram was at the outer end of its stroke, to expel the ice block, it covered port 39 into the press, as seen in Fig. 6, so that even should the valve be disarranged, or inoperative no ice particles could then pass into the press. This is an extra precaution against any ice particles passing to the inner side of the ram, making it impossible for the ice particles to flow in between the ram and its gate. The operation of the rams and valves are alternate and intermittent, with an interval of time for the flow of ice particles to the presses.

The ice particles are gathered from a tank (not shown) by a pump 40 having a suction pipe 41 connected to the tank and a delivery pipe 42 passing to a three way valve 43 connected to pipes 24, 25 heretofore described. A hand wheel 44 is used by the attendant to operate valve 43 to connect pipes 42, 24 and 42, 25 alternately, to permit the flow of ice particles to the valves 22, 23 under the presses 3, 4. There is also within easy reach of the attendant a handle 45 on a rod 46 connected to a lever 47, fulcrumed at 48, which operates a clutch 49 to connect and disconnect sprocket wheel 50 to shaft 51 of pump 40 to start and stop the pump.

The presses 3, 4, have perforated linings, for which I was granted Patent 730,018, June 2, 1903. The upper and side perforations in connection with pipes 52, 53 will remove any air carried into the presses with the ice particles, and the lower perforations permit the escape of the water which is necessarily carried over with the ice particles.

In order to enable the attendant to know the movements and exact positions of piston 15 and rams 18, 19, an indicator is provided which is composed of a roller 54 resiliently mounted on a stand 55 for rotary contact with piston rod 17 and the contact is made positive by a spring 56 which presses the roller to the rod. A cord 57 is wound on roller 54 and carried up and over a wheel 58 secured in a suitable manner for the purpose, and suspends a weight 59 which is guided in a slot 60 of the indicator plate 61 and to the weight there is attached a pointer 62 which points to double lines of graduations 0 to 24 in reverse order enabling the attendant to observe the strokes or movements of the piston and rams and their exact positions.

I claim:

1. In an ice machine, a double acting hydrostatic cylinder, a piston therein having piston rods therefor passing from the cylinder at each end, a high and a low pressure valve for fluid flowing to and from the cylinder, tandem ice presses, rams therein co-acting with the cylinder's piston, openings at the lower side of the presses for ice flowing, and rotatable valves having automatic means for opening and closing the openings.

2. In an ice machine, a double acting hydrostatic cylinder, a high and a low pressure valve for its control, an ice press placed at each end of the cylinder, a piston in the cylinder, and double piston rods extending outward therefrom, entering the ice presses and attached to a ram in each press, a valve for ice admission under each press, and means automatically operated by the ram of each press to open the valve as the ram approaches the end of the press adjacent the hydrostatic cylinder.

3. In an ice machine, a double acting hydrostatic cylinder, high and low fluid pressure valves for its control, ice presses in alinement therewith, one being at each end, a piston in the cylinder, a ram in each press with means to connect each press ram with the hydrostatic piston for co-acting therewith; an ice valve under each press, and means automatically operative by the ram of each press to open its valve for ice admission thereto as its ram approaches the hydrostatic cylinder, and independent resilient means to automatically close the valve and stop the flow of ice as the ram moves toward the outer end of the press and its inclosing gate.

4. In an ice machine, a hydrostatic cylinder and horizontal piston valves one for high pressure and one for low pressure for its control, ice presses in alinement therewith, a piston in the cylinder, a ram in each press and means for the co-action of the piston and rams, rotatable ice admission valves under the presses, a pump having means to receive ice particles, means to convey the ice particles from the pump to the valves of the presses, and means to alternately put the pump and its connections in communication with one press to the exclusion of the other, and vice versa.

5. In an ice machine, a double acting hydrostatic cylinder, and two ice presses, arranged in alinement, or tandem, the cylinder being intermediate the presses; a piston in the cylinder and a ram in each press, means for the reciprocating motion of the piston and rams, means to close the outer ends of the presses during their act of compressing an ice block, to then open them for the expulsion of the block and again close them; means to gather and supply ice particles to the presses, valves to control the supply of ice particles to the presses, the valves being placed below the presses so that any air passing along with the ice particles shall be free to enter the presses, and means to convey the entering air away from the presses.

6. In an ice machine, a hydrostatic cylinder, ice presses connected therewith, a piston in the cylinder, rods therefrom to a ram in each press, and means actuated by the pistons whereby the movements and positions of the piston in the cylinder and the rams in the presses may be visually observed.

7. In an ice machine the combination with a press of a feed pipe for delivering ice particles to the press, means for forcing the ice particles through the feed pipe and a valved port located in the lower side of the press to govern the inflow of the commingled ice particles, water and air.

8. In an ice machine, the combination with a press, of a feed pipe for conveying ice particles to the press, means for forcing the ice particles through the feed pipe, a port located in the lower side of the press and an automatically operated valve located in the feed pipe to govern the inflow of the commingled ice particles, water and air through the port.

9. In an ice machine, the combination of a press having a port at one end, closed by the ram of the press at the end of its forward stroke, an ice particle supply pipe leading to the port, and a valve governing the port.

10. In an ice machine, the combination of a duplex press whose members act in alternation, an ice particle port at the bottom and outer end of each press over which the ram slides to close it at the end of the compression stroke, and means for conveying ice particles through the port, and valves for the port.

11. In an ice machine, the combination of a press having a ram and operative means, an ice-particle port at the outer end and bottom of the press, governed by rotating valves, and means actuated by the ram to operate the valves.

In testimony whereof I have hereunto signed this specification in the presence of two witnesses.

DANIEL L. HOLDEN.

Witnesses:
P. E. LAUSEN,
JOHN KLEUTZ.